July 29, 1924.　　　　　　　　　　　　　　1,503,369
J. P. LAVOIE
PISTON
Original Filed April 21, 1921
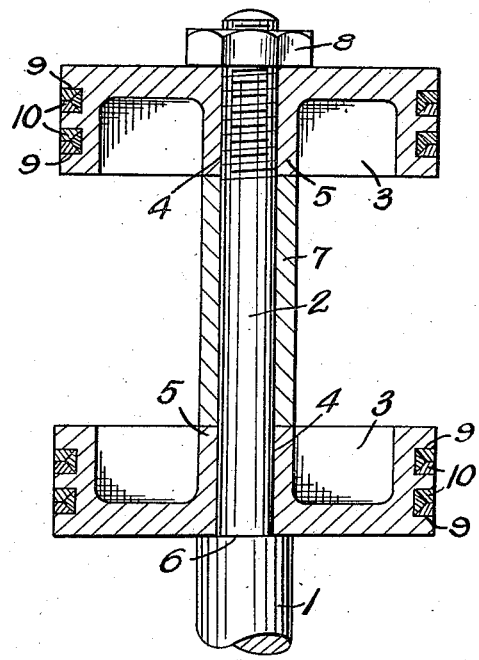
Inventor
J. P. Lavoie
By
Attorney Patented July 29, 1924.

1,503,369

UNITED STATES PATENT OFFICE.

JOSEPH PIERRE LAVOIE, OF MONTREAL, QUEBEC, CANADA.

PISTON.

Application filed April 21, 1921, Serial No. 463,175. Renewed December 17, 1923. Serial No. 579,767.

*To all whom it may concern:*

Be it known that I, JOSEPH PIERRE LAVOIE, a British subject, residing at 2689 Notre Dame east, in the city of Montreal, in the Province of Quebec, in the Dominion of Canada, have invented certain new and useful Improvements in Pistons; and I do hereby declare that the following is a full, clear, and exact description of the same.

The present invention relates to improvements in pistons, which will be hereinafter described in the following specification and which are illustrated in the accompanying drawing.

The drawing is a vertical sectional view through a piston according to the invention.

Referring to the drawing: 1 is a piston rod having adjacent one end thereof a reduced portion 2 upon which are mounted the cup-shaped members 3 of the same dimensions.

Each of these members 3 has cup-shape and each a central opening 4, and a collar 5 extending from said opening and integral with said member, said collar forming a support or bearing for said member. The lower member abuts against the circumferential shoulder 6 formed at the point where the reduced portion of the rod begins, and the upper or top member is preferably inverted in relation to the lower member. The two members are spaced from one another by a sleeve 7 which abuts on the ends of the collars 5 and which has the same external diameter as said collar and 8 is a nut which threads on the end of the reduced portion 2 of the rod 1, and which secures the said members together.

Each member has around its periphery circumferential recesses 9 in which are secured the rings 10.

By spacing the cup-shaped members from one another, an elongated piston will be provided which is particularly suitable for use in engines of the uniflow type; considerable material will be saved, and considerable friction and weight will be eliminated. Should any parts break or wear out, they can be easily replaced.

What I claim as my invention is:

A piston, comprising a rod having a reduced portion providing a circumferential shoulder at the point where such portion begins; a cup-shaped head abutting against said shoulder and formed with a central bearing collar through which said reduced portion passes; a spacing sleeve of substantially the same external diameter as said collar fitted on said reduced portion and abutting at one end directly against the free end of the collar, the said reduced portion projecting beyond the other end of said sleeve and having a threaded terminal; a second cup-shaped head disposed in inverted relation to the first head and formed with a central bearing collar of the same external diameter as the first collar which rests directly upon the adjacent end of the spacing sleeve and through which the said reduced portion of the piston rod projects; and a fastening nut threaded on the terminal of said portion and tightened against the outer face of the second head.

Signed at Montreal, Quebec, Canada, this 8th day of April, 1921.

JOSEPH PIERRE LAVOIE.

Witnesses:
C. PATENAUDE,
G. BEAUDOIN.